United States Patent
Carpenter

[19]

[11] Patent Number: 5,913,447
[45] Date of Patent: Jun. 22, 1999

[54] INSTRUMENT CASING ASSEMBLY

[75] Inventor: David M. Carpenter, Berea, Ky.

[73] Assignee: Dresser Industries, Inc., Dallas, Tex.

[21] Appl. No.: 08/937,046

[22] Filed: Sep. 24, 1997

Related U.S. Application Data

[63] Continuation of application No. 08/619,212, Mar. 21, 1996, abandoned.

[51] Int. Cl.[6] .................................................. B65D 25/54
[52] U.S. Cl. ........................ 220/664; 220/602; 220/663
[58] Field of Search .................................. 220/602, 662, 220/663, 664, 309.1, 2.114, 2.112, 2.37

[56] References Cited

U.S. PATENT DOCUMENTS

| | | | |
|---|---|---|---|
| 372,352 | 11/1887 | Bailey | 220/662 X |
| 1,535,616 | 4/1925 | MacGahan | 220/664 |
| 1,748,852 | 2/1930 | Smith | 220/602 |
| 1,932,044 | 10/1933 | Mylius | 220/664 X |
| 1,975,703 | 10/1934 | Vitale | 220/602 |
| 2,402,360 | 6/1946 | Bevins | 220/664 |
| 3,530,723 | 9/1970 | Hogue et al. | 220/664 X |
| 3,549,043 | 12/1970 | Waite | 220/664 |
| 3,578,202 | 5/1971 | Mainet . | |
| 3,622,038 | 11/1971 | Wilhelm . | |
| 3,630,089 | 12/1971 | Bissell . | |
| 3,765,249 | 10/1973 | Bissell | 220/664 X |
| 3,803,918 | 4/1974 | Blough, Jr. . | |
| 3,922,919 | 12/1975 | Schulze et al. . | |
| 4,146,258 | 3/1979 | Andruchiw | 220/664 X |
| 4,438,866 | 3/1984 | Gegaregian et al. . | |

*Primary Examiner*—Allan N. Shoap
*Assistant Examiner*—Niki M. Eloshway
*Attorney, Agent, or Firm*—Daniel Rubin

[57] ABSTRACT

An instrument casing assembly and a method of forming the casing that includes a case for receiving a lens having an integral peripheral shoulder engageable with a sidewall of the case. The sidewall when crimped about the shoulder, providing a gasketless water-tight seal to protect the internal parts of the instrument assembly.

20 Claims, 2 Drawing Sheets

INSTRUMENT CASING ASSEMBLY

This application is a continuation of application Ser. No. 08/619,212, filed Mar. 21, 1996, now abandoned.

FIELD OF THE INVENTION

This invention relates to an instrument casing assembly and more particularly to a waterproof casing assembly for a pressure gauge.

BACKGROUND OF THE INVENTION

Instruments and gauges used for measuring temperature or pressure are generally enclosed and protected by a lens over the face of the instrument to be protected. Various instruments of this type are disclosed, for example, in U.S. Pat. Nos. 3,630,089; 3,622,038; 3,803,918 and 3,922,919. For certain applications regulation standards, such as U.L. Laboratories, require that the instrument be watertight in order to prevent moisture penetration that could adversely affect instrument performance. The standard imposed by UL requires that the gauge withstand water penetration after a two hour immersion at a one-foot depth. The gauge must also withstand repetitive water sprays following 720 hours of ultraviolet exposure.

Typically, an instrument such as a pressure gauge as disclosed, for example, in U.S. Pat. No. 3,630,089, includes an open end crimpable case, a dial, a protective transparent lens overlying the dial and a resilient gasket compressed intervening between the underside periphery of the lens and dial. Before crimping of the case, a peripheral sidewall on the open end of the case coaxially extends from the case body to receive the dial, lens and intervening gasket. The sidewall is comprised of a corrosion proof ductile material, such as stainless steel. With the elements in place, the open end of the case is compressively crimped tautly about the periphery of the lens to secure the lens against the gasket and the gasket against the dial in place within the case.

The casing structure of U.S. Pat. No. 3,630,089 has been almost exclusively utilized as a pressure gauge on fire extinguishers and has enjoyed many years of commercial success. However, such extinguishers are commonly placed on boats, oil platforms, etc. where high levels of U.V. exposure and water are typically encountered. The casing assembly thereof affords a waterproof and dust-proof enclosure formed of a cup-shaped shell-like corrosion resistant case that is compressively crimped about the peripheral edge of the lens to force and secure the lens against the underlying gasket.

It should be evident that such gauges are mass produced in a highly cost competitive market. As a consequence, each manufacturer strives to reduce fabrication cost of the gauge to the maximum extent possible in order to enhance its competitive market position. Despite recognition of the competitive cost factors, previous efforts to reduce case costs while maintaining U.L. standards have heretofore been largely unsuccessful.

OBJECTS OF THE INVENTION

It is an object of this invention to provide a novel instrument casing assembly that is sealed in a watertight relation.

It is a further object of this invention to effect the previous object with a gasketless seal arrangement in which an integral lens construction effects a watertight seal relation with the crimped sidewall of the case.

It is a still further object of the invention to effect the previous objects with an instrument casing assembly that is of simple manufacture and design, as well as relatively low cost in manufacture and assembly compared to casing assemblies of the prior art.

SUMMARY OF THE INVENTION

This invention relates to a water sealed casing for a gauge instrument. More specifically, the invention relates to a novel casing assembly constructed to preclude moisture penetration to internally of the casing.

The foregoing is achieved with an instrument casing assembly that includes prior to assembly a case having on one end a radially extending shoulder and a circular axially extending sidewall about the periphery of the shoulder. A dial plate is supported on the shoulder while a lens of plastic composition having an integral annular seal section about the lower periphery of the lens is closely received within the sidewall of the case.

For completing assembly, an annular crimping of the case sidewall is effected into a tautly conforming wrap fit about and onto the peripheral seal section of the lens. This results in a water tight primary seal between the crimped sidewall and the lens along with a water tight secondary seal readily effected between the edge corner of the seal section and the radius of the case. This is achieved without the need for an intervening elastomeric seal or sealing compound. The economic virtues thereof should be instantly apparent.

The features and advantages of the invention will be appreciated by those skilled in the art upon reading the detailed description which follows in conjunction with the drawings.

DESCRIPTION OF THE PREFERRED EMBODIMENT

Figure 1:
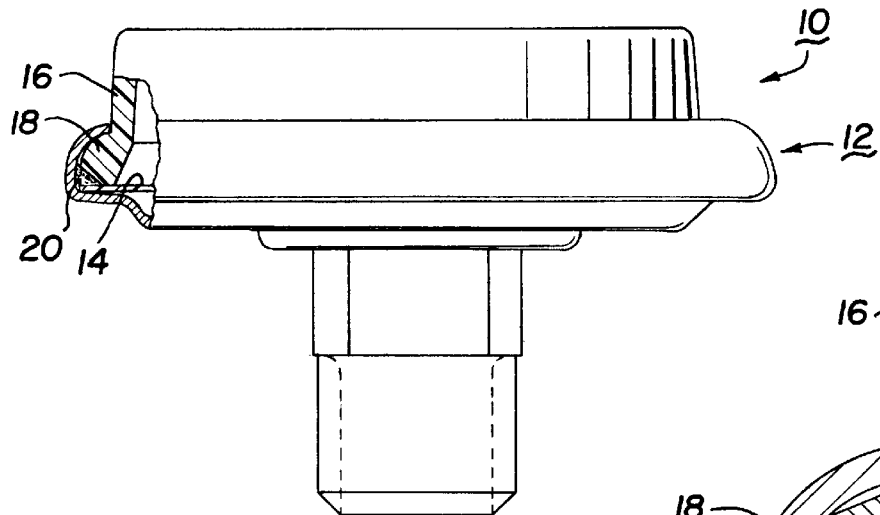
FIG. 1 is a side elevational view partially broken away of a prior art instrument casing assembly.

In the description which follows, like parts are marked throughout the specification and drawings with the same reference numerals respectively. The drawing figures are not necessarily to scale and in certain views, parts may have been exaggerated for purposes of clarity.

Figure 2:
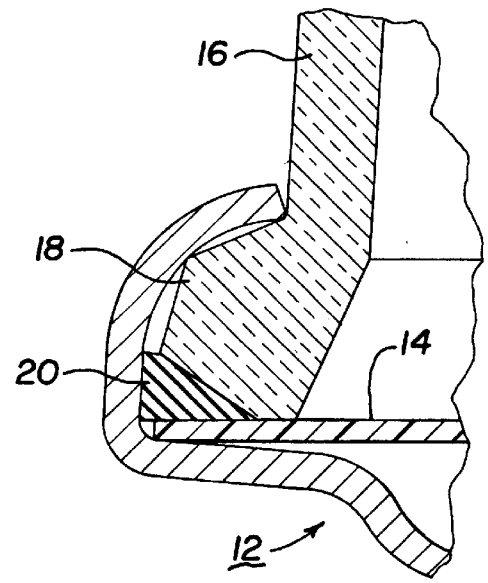
FIG. 2 is an enlarged detailed view of the seal construction in the prior art shown in FIG. 1.
Figure 3:
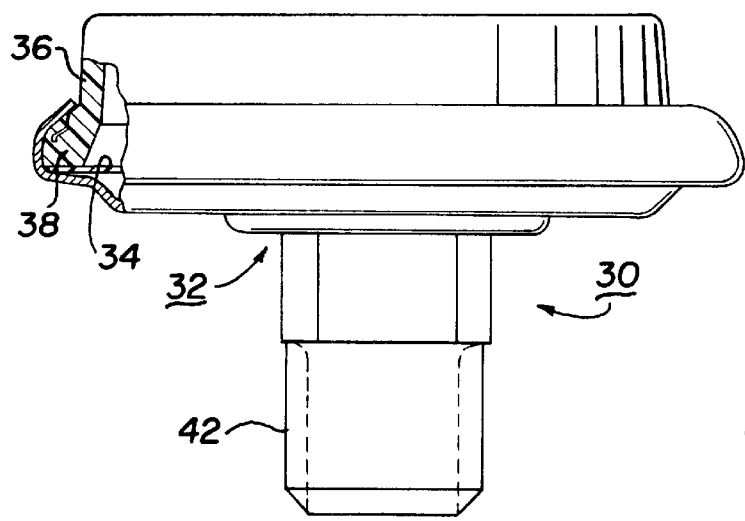
FIG. 3 is a side elevational view partially broken away of an instrument casing assembly of the present invention.

Referring now to the drawings, there is illustrated in FIGS. 1 and 2 a casing assembly of the prior art which may, for example, be of a type disclosed in U.S. Pat. No. 3,630,089. The gauge is generally designated 10 that includes a cup-like case 12, a dial plate 14 and an annular lens 16. The casing is compressively crimped up and about a peripheral shoulder flange 18 while an annular gasket 20 is compressively wedged intervening between the dial plate and an underside chamfer of shoulder 18 provides a secondary seal that renders the assembly water tight.

The gauge construction of the invention can be best understood by reference to FIGS. 3–6. As thereshown, as instrument casing assembly is designated 30 that includes a case 32, a dial plate 34 and a lens 36.

Figure 4:
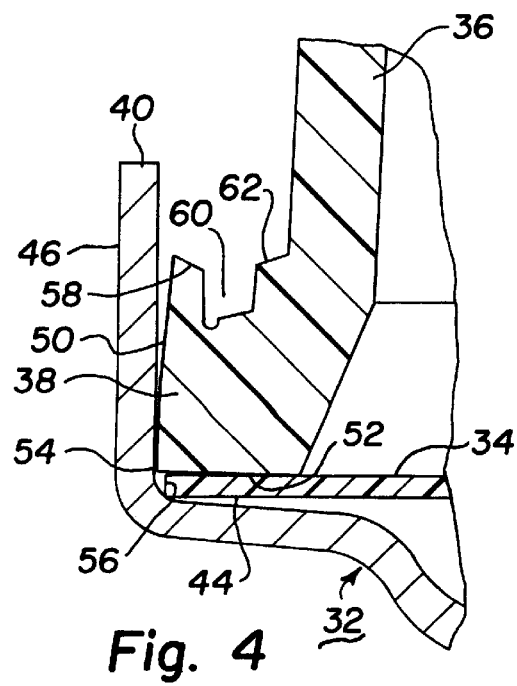
FIG. 4 is an enlarged detailed view of the pre-sealed seal components in the instrument casing assembly of the invention.

Case 32 prior to assembly includes an open end 40 for receiving dial plate 34 and lens 36 which as above includes a peripheral flange-like shoulder 38. As shown in FIG. 4, open end 40 has a radially extending shoulder 44 and an annular sidewall 46 extending axially from the periphery of shoulder 44. Preferably, case 32 including open end section 40 is comprised of a ductile, pliable composition, such as stainless steel or the like. Beneath the case is a threaded mounting end 42 for securing the gauge to the system in which it is to be installed.

Figure 5:
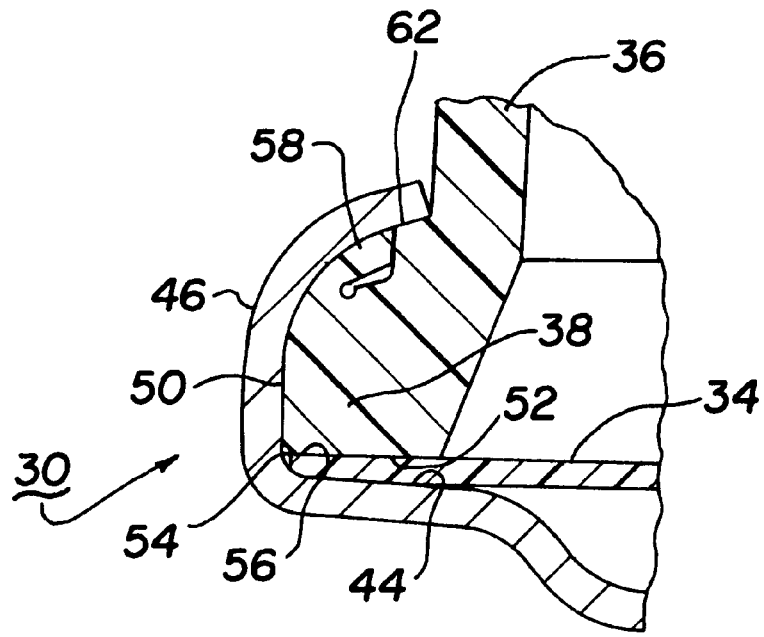
FIG. 5 is an enlarged detailed view of the seal components of FIG. 4 shown in their sealed relation.
Figure 6:
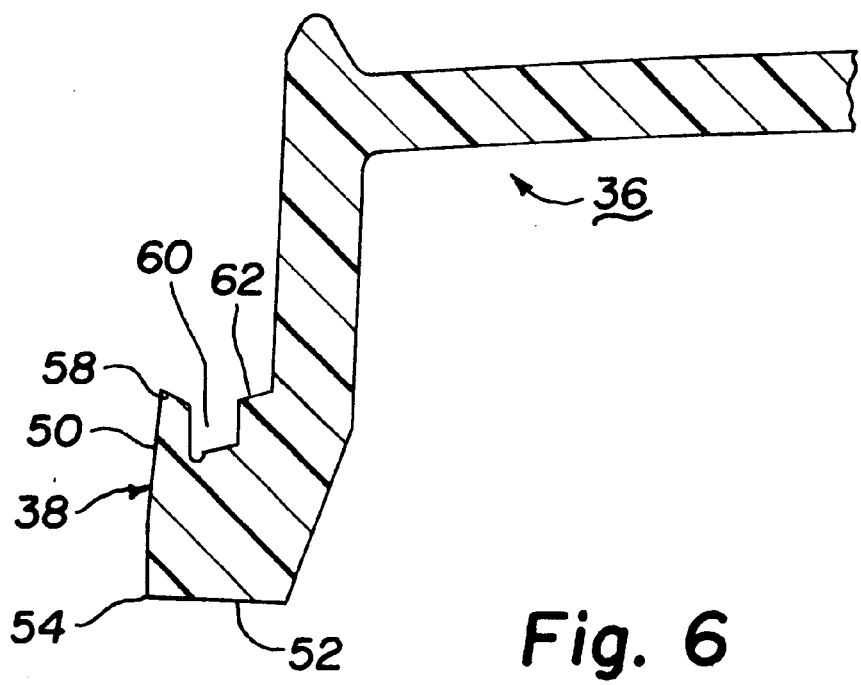
FIG. 6 is partial cross-sectional view of the lens of the instrument casing assembly of the invention.

The lens 36 is of a suitable transparent relatively rigid composition such as polycarbonate plastic that includes the annular peripheral shoulder flange 38 having an annular side surface 50. As best seen in FIGS. 5 and 6, flange surface 50 axially extends integrally from a base 52 of lens 36 at which it defines a relatively sharp annular corner 54. During pre-assembly, corner 54 contiguously confronts the internal radius 56 thereat of case 32. Upstanding from base 52, the shoulder terminates in an upper rim 58 that is sufficiently flexible enabling it to be folded over past a void 60 and against a ledge 62 of lens 36.

FIG. 4 illustrates annular sidewall 46 in its pre-assembled axially extending relation to receive dial 34 seated against shoulder 44. Base 52 of lens 36 is overlying the peripheral face of dial 34 to secure the dial against case 32. Shoulder 38 has corner 54 contiguously confronting internal radius 56. With the components in place, assembly along with a primary seal is effected by mechanically crimping sidewall 44 in a taut wrap about and against shoulder face 50. This concomitantly causes corner 54 to incur a forced engagement against the internal case wall at radius 56 (FIG. 5).

The engagement thus incurred during crimping of sidewall 46 against corner 54 results in secondary water-tight sealing relation therebetween that in combination with the primary seal incurred by the crimped wrap thereabout is able to protect dial 34 and the internal parts of the instrument against water penetration, even under conditions of extensive U.V. exposure.

By the above description there is disclosed a novel construction for effecting a gasketless assembly of a gauge casing. Not only does such assembly achieve a water tight seal for protecting the internal gauge components, but it does so with fewer assembly parts than heretofore. As a consequence, the cost of manufacture is reduced thereby enhancing the competitive advantage in the marketing of such gauges.

Since many changes could be made in the above construction and many apparently widely different embodiments of this invention could be made without departing from the scope thereof, it is intended that all matter contained in the drawings and specification shall be interpreted as illustrative and not in a limiting sense.

What is claimed is:

1. A casing assembly for a pressure gauge comprising:
   A) a cup-like case internally defining when unassembled a radially extending shoulder and an annular sidewall in an upstanding relation from about the periphery of said shoulder; and
   B) a lens within said sidewall supported on said shoulder and defining an exterior periphery from a lower periphery at said shoulder to an upper periphery above said shoulder;
   C) said sidewall when assembled being crimped from said upstanding relation directly against and about the upper periphery of said lens for effecting a gasketless moisture seal extending substantially from between about the shoulder of said case to about the upper periphery of said lens.

2. The casing assembly as set forth in claim 1 including an annular shoulder about the periphery of said lens and said case sidewall is crimped about said annular shoulder into a forced engagement against said lens.

3. The casing assembly as set forth in claim 2 wherein the annular shoulder of said lens includes a surface portion axially extending about the periphery of said lens and said forced engagement is effected against said surface portion of said lens.

4. The casing assembly as set forth in claim 3 wherein said annular shoulder is integral of said lens.

5. The casing assembly as set forth in claim 4 wherein said annular lens shoulder and said lens are comprised of a polymer plastic composition.

6. The casing assembly as set forth in claim 3 wherein the annular shoulder of said lens defines an annular ledge along the topside of said annular shoulder inwardly spaced form said axially extending surface portion of said lens shoulder whereby crimping the sidewall of said case bends said case about said axially extending surface portion toward said ledge into said forced engagement while the sidewall of said case terminates folded against said ledge.

7. The casing assembly as set forth in claim 2 in which the radially extending shoulder of said case and the annular sidewall of said case are arranged angularly offset from each other, the periphery of the annular shoulder of said lens includes a continuous protuberance contiguously located relative to the internal surface of the sidewall of said case in the vicinity of said offset arrangement, and the crimping of said sidewall effects a forced engagement between said protuberance and said sidewall to produce a seal thereat.

8. The casing assembly as set forth in claim 7 in which said protuberance comprises an underside peripheral corner of the annular shoulder of said lens.

9. The casing assembly as set forth in claim 6 in which said sidewall crimping onto said ledge generally effects a primary seal and said forced engagement effects a secondary seal in a series relation to said primary seal.

10. A method of forming a water tight seal for a pressure gauge casing assembly comprising the steps of:
   a) providing a cup-like case internally defining a radially extending shoulder and an annular sidewall in an upstanding relation about the periphery of said shoulder;
   b) providing on said shoulder and within the sidewall of said case a lens defining an exterior periphery from a lower periphery at said shoulder to an upper periphery above said shoulder;
   c) crimping said sidewall from said upstanding relation directly against and about the periphery of said lens for effecting a gasketless moisture seal extending substantially from between about said shoulder to about the upper periphery of said lens.

11. The method as set forth in claim 10 in which said lens includes an annular shoulder about the periphery of said lens, and said case sidewall is crimped about said annular lens shoulder.

12. The method as set forth in claim 11 wherein said annular shoulder is integral of said lens.

13. The method as set forth in claim 11 in which the radially extending shoulder of said case and the annular sidewall of said case are angularly offset from each other, the periphery of the annular shoulder of said lens includes a continuous protuberance contiguously positioned relative to the internal surface of said sidewall in the vicinity of said offset, and the step of crimping said sidewall effects a forced engagement between the protuberance of said lens and the annular sidewall of said case to produce a seal thereat.

14. The method as set forth in claim 13 in which the protuberance of said lens comprises an underside peripheral corner of the annular shoulder of said lens.

15. A casing assembly for a pressure gauge comprising:
   A) a cup-like case internally defining a radially extending shoulder and an annular sidewall in an upstanding relation from about a lower periphery of said shoulder; and
   B) a lens supported on said shoulder peripherally surrounded by said sidewall from a lower periphery at said shoulder to an upper periphery above said shoulder;
   C) said sidewall being crimped from said upstanding relation directly against and about the periphery of said lens for effecting a gasketless moisture seal extending substantially from between about said shoulder to about the upper periphery of said lens.

16. The casing assembly as set forth in claim 15 in which said lens includes an annular shoulder about its periphery and the annular sidewall of said case is crimped about said annular shoulder.

17. The casing assembly as set forth in claim 16 wherein said annular shoulder of said lens includes an upper surface portion axially extending about the periphery of said lens.

18. The casing assembly as set forth in claim 17 wherein the annular shoulder of said lens defines an annular ledge along the topside of said annular shoulder inwardly spaced from said axially extending upper surface portion whereby the crimping of said case bends the annular sidewall of said case toward said ledge while the sidewall of said case terminates folded against said ledge.

19. The casing assembly as set forth in claim 16 in which the radially extending shoulder of said case and the annular sidewall of said case are arranged angularly offset from each other, the periphery of the annular shoulder of said lens includes a continuous protuberance contiguously located relative to the internal surface of said sidewall in the vicinity of said offset arrangement, and the crimping of said annular sidewall effects a forced engagement between said protuberance and said annular sidewall to produce a seal thereat.

20. The casing assembly as set forth in claim 19 in which said protuberance comprises an underside peripheral corner of the annular shoulder of said lens.

* * * * *